No. 645,023. Patented Mar. 6, 1900.
C. W. H. SMITHERS.
BICYCLE SUPPORT.
(Application filed Nov. 13, 1899.)
(No Model.)
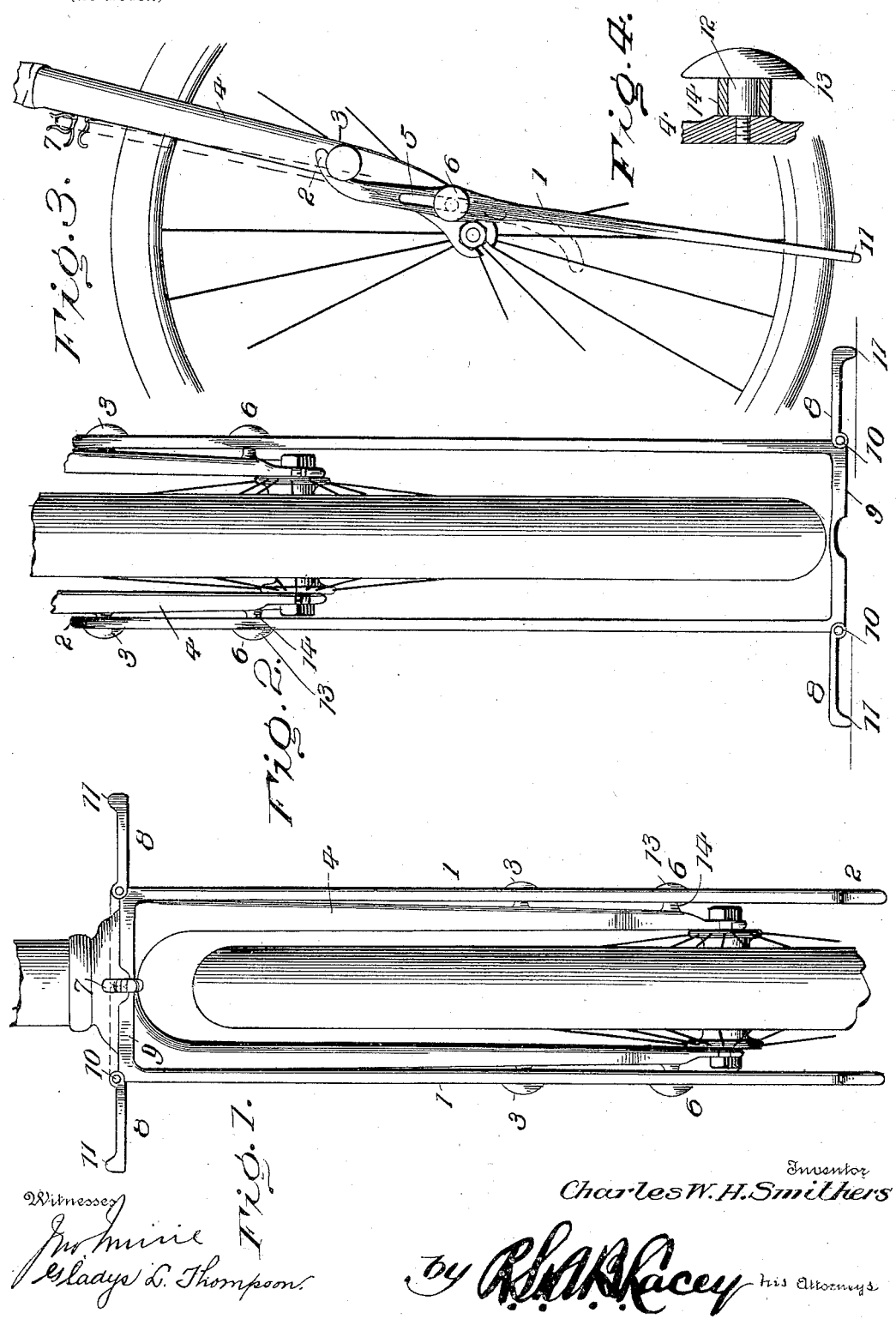
Witnesses
Inventor
Charles W. H. Smithers
by R. S. & A. B. Lacey, his Attorneys

UNITED STATES PATENT OFFICE.

CHARLES W. H. SMITHERS, OF FOND DU LAC, WISCONSIN, ASSIGNOR OF ONE-HALF TO ANTHONY A. KELLY, OF SAME PLACE.

BICYCLE-SUPPORT.

SPECIFICATION forming part of Letters Patent No. 645,023, dated March 6, 1900.

Application filed November 13, 1899. Serial No. 736,852. (No model.)

*To all whom it may concern:*

Be it known that I, CHARLES W. H. SMITHERS, a citizen of the United States, residing at Fond du Lac, in the county of Fond du Lac and State of Wisconsin, have invented certain new and useful Improvements in Bicycle-Supports; and I do hereby declare the following to be a full, clear, and exact description of the invention, such as will enable others skilled in the art to which it appertains to make and use the same.

Various have been the means devised for holding a bicycle in an upright position when temporarily left unattended, and the present invention is in this line, being designed to provide a foldable support of novel construction and merit and applied to the frame of the machine, so as to afford a rest for the feet when coasting and a support for the machine when it is desired to leave the latter standing.

The support is a frame of approximately U shape, having folding extensions at its closed end to provide rests for the rider's feet when coasting and feet for the support when the latter is turned to hold the machine in an upright position, said support or frame having a pivotal and sliding connection with the lower end of the front-fork sides of a bicycle and stops applied to the fork sides to engage with the lower end of the frame-bars of the support and hold the latter when turned into an operative position.

The precise formation of the pivoted frame, the manner of pivotally and slidably connecting it with the fork member of the bicycle, the disposition of the stops, and the construction of the hinge-joints of the pivoted extensions are unimportant within the spirit of the invention and may be altered to meet varying conditions and the caprice of the constructor.

Referring to the drawings forming a part of this specification and in which corresponding and like parts are indicated by the same reference characters in all the views, Figure 1 is a front view of the support, showing its relation when folded. Fig. 2 is a view similar to Fig. 1, showing the support in operation. Fig. 3 is a detail side elevation showing the two extreme positions of the support by full and dotted lines. Fig. 4 is a detail view of a stop and pivot-support.

The support is applied to the front fork of a bicycle or tandem, and consists of a U-shaped frame 1, having the end portions of its side bars curved, as shown at 2, to engage over the stops 3, applied to the fork sides 4 when the support is turned, so as to hold the machine in an upright position. Longitudinal slots 5 are provided in the free end portions of the frame-bars and receive the pivot-fastenings 6, upon which the frame turns and has a limited sliding movement, the slots 5 being of such length and disposition as to admit of the extremities of the bars of the frame 1 clearing the stops 3 when turning the support into or out of an operative position. When the support is turned into position for holding the machine upright, it inclines forwardly at its lower end, and the curved ends 2 engage over the stops 3, and the pivot-fastenings 6 occupy the upper ends of slots 5. To fold the support, the front end of the machine is lifted, which permits the support to drop a distance corresponding to the length of the slots 5, which is ample for its side bars to clear the stops 3, when the support can be folded upwardly and forwardly, a clip 7, applied to the fork-crown, engaging with the closed end of the frame and holding it folded.

Extensions 8 are connected to the cross-bar 9 of the frame 1 by rule-joints 10, which limit the movement of the parts 8 when turned outward. Projections 11 at the extremities of the parts 8 constitute guards to prevent lateral slipping of the feet of the rider when coasting and rests for the support when holding the machine upright. The butts of the rule-joints 10, projecting above the parts 8, form inner stops for the rider's feet. The pivoted extensions 8 unfold from the center outward and fold in an inverse direction and when folded are out of the way and are adapted to be held folded by the clip 7.

The stops and the pivot-fastenings are similarly constructed and consist of a stud 12, having its inner end reduced and threaded into the fork side and a flange or head 13 at its outer end to overlap the pivoted frame-bar and prevent outward movement thereof.

A roller or sleeve 14 is mounted upon the body of the stud between the head 13 and the fork side 4 and is free to turn and relieves the friction incident to the sliding movements of the support.

The support can be attached to any make of machine and when folded is out of the way and can be used as a coaster and when required to hold the machine upright can be easily detached from the clip 7 and turned into operative position, the machine being lifted sufficient to permit the curved ends 2 to clear the stops 3 when the machine is lowered. The support is folded by a reverse of the movement just described and in the manner aforesaid.

Having thus described the invention, what is claimed as new is—

1. In a bicycle-support, the combination with the front fork, of upper and lower studs applied to the lower end portions of the fork sides, and a folding support consisting of a frame of approximately U form having its side bars embracing the fork sides and pivotally and slidably mounted upon the lower studs, the extremities of the said side bars being engaged with and disengaged from the upper studs by a vertical movement of the frame, substantially as described.

2. In a bicycle-support, the combination with the front fork, of an approximately U-shaped frame pivoted to the fork sides and adapted to be turned so as to form a support, lateral extensions connected by a rule-joint to the cross-bar of the frame and having projections at their ends to form guards and rests in the manner set forth, and a clip applied to the fork-crown to hold the frame and the pivoted lateral extensions folded, substantially as set forth.

3. In a bicycle-support, the combination with the front fork, upper and lower studs applied to the fork sides and having their outer ends flanged or headed, and roller-sleeves on the studs, of a U-shaped frame having its side bars longitudinally slotted to receive the aforesaid lower studs upon which the frame is slidably and pivotally mounted, and having the end portions of the said bars curved to engage with the upper studs, substantially as set forth.

4. In a bicycle-support, the combination with the front fork, upper and lower studs applied to the fork sides and having their outer ends flanged or headed, and roller-sleeves on the studs, of a U-shaped frame having its side bars longitudinally slotted to receive the aforesaid lower studs upon which the frame is slidably and pivotally mounted, and having the end portions of the said bars curved to engage with the upper studs, lateral extensions connected by rule-joints with the cross-bar of the frame and having projections at their ends to form guards and rests, and a clip applied to the fork-crown to hold the frame and the pivoted lateral extensions thereof folded, substantially as specified.

In testimony whereof I affix my signature in presence of two witnesses.

CHARLES W. H. SMITHERS. [L. S.]

Witnesses:
ED. L. MALONEY,
WM. OAKEY.